US 9,718,383 B2

(12) United States Patent
Matsui

(10) Patent No.: US 9,718,383 B2
(45) Date of Patent: Aug. 1, 2017

(54) SPRING MEMBER MOUNTING STRUCTURE OF SEAT FRAME FOR VEHICLE

(71) Applicant: TOYOTA BOSHOKU KABUSHIKI KAISHA, Aichi-ken (JP)

(72) Inventor: Hayato Matsui, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 161 days.

(21) Appl. No.: 14/694,471

(22) Filed: Apr. 23, 2015

(65) Prior Publication Data
US 2015/0306998 A1 Oct. 29, 2015

(30) Foreign Application Priority Data
Apr. 25, 2014 (JP) ................. 2014-091102

(51) Int. Cl.
*B60N 2/54* (2006.01)
*B60N 2/70* (2006.01)
*B60N 2/68* (2006.01)
*B60N 2/72* (2006.01)

(52) U.S. Cl.
CPC ............ *B60N 2/546* (2013.01); *B60N 2/68* (2013.01); *B60N 2/7058* (2013.01); *B60N 2/7094* (2013.01); *B60N 2/72* (2013.01)

(58) Field of Classification Search
CPC .... B60N 2/7058; B60N 2/7094; B60N 2/546; B60N 2/72; B60N 2/68; A47C 7/30
See application file for complete search history.

(56) References Cited

U.S. PATENT DOCUMENTS

| 5,624,161 | A  | * | 4/1997  | Sorimachi | A47C 7/28 267/112 |
| 6,854,804 | B2 | * | 2/2005  | Cruz Fernandes de Pinho | B60N 2/7094 297/452.49 |
| 7,137,669 | B2 | * | 11/2006 | Nagayama | A47C 7/02 297/216.1 |
| 7,794,021 | B2 | * | 9/2010  | Sahashi | B60N 2/72 297/452.49 |
| 8,353,558 | B2 | * | 1/2013  | Okamoto | B60N 2/1615 297/216.1 |

(Continued)

FOREIGN PATENT DOCUMENTS

JP   2002-225600   8/2002

OTHER PUBLICATIONS

U.S. Appl. No. 14/719,720 to Hayato Matsui, which was filed on May 22, 2015.

*Primary Examiner* — David R Dunn
*Assistant Examiner* — Tania Abraham
(74) *Attorney, Agent, or Firm* — Greenblum & Bernstein, P.L.C.

(57) ABSTRACT

The present invention relates to a spring member mounting structure, which is a structure for mounting a spring member on a cushion frame connecting side frames by use of a rear pipe. The spring member has rear clipping portions engaged with the rear pipe. Cover members, which are provided at seat central sides of connecting portions of the side frames and the rear pipe, have extension portions extending toward the seat central sides. The rear clipping portions abut on ends of the seat central sides of the extension portions, and are mounted to the rear pipe by width direction positioning of the spring member.

6 Claims, 6 Drawing Sheets

(56) References Cited

U.S. PATENT DOCUMENTS

| | | | | |
|---|---|---|---|---|
| 2011/0044753 A1* | 2/2011 | Kotaki | ................ | B60N 2/7041 |
| | | | | 403/235 |
| 2013/0119715 A1* | 5/2013 | Medoro | ................ | B60N 2/686 |
| | | | | 297/180.1 |
| 2013/0313876 A1* | 11/2013 | Perrin | ..................... | B60N 2/24 |
| | | | | 297/344.13 |
| 2014/0159463 A1* | 6/2014 | Takeuchi | ............ | B60N 2/7094 |
| | | | | 297/452.52 |

* cited by examiner

SPRING MEMBER MOUNTING STRUCTURE OF SEAT FRAME FOR VEHICLE

INCORPORATION BY REFERENCE

The disclosure of Japanese Patent Application No. 2014-091102 filed on Apr. 25, 2014 including the specification, drawings and the abstract is incorporated herein by reference in its entirety.

BACKGROUND OF THE INVENTION

1. Field of the Invention

The present invention relates to a structure for mounting a spring member supporting a seat occupant on a seat frame for a vehicle.

2. Description of Related Art

The seat frame for a vehicle is provided with a spring member such as an S spring to support the seat occupant, and the spring member is positioned and mounted relative to the seat frame. In the seat frame for a vehicle as described in Japanese Patent Application Publication No. 2002-225600 (JP 2002-225600 A), a portion of a rear pipe or a front pipe connecting a pair of left and right side frames is diameter-expanded by a hydroforming process to provide a large-diameter portion, such that both ends in a width direction of a retainer having an S-shaped cross section provided at a terminal of the S spring abut on and are clipped at the large-diameter portion of the seat frame.

In the technology described in JP 2002-225600 A, both ends in the width direction of the retainer abut on and are clipped between the large-diameter portions provided on a portion of the rear pipe or the front pipe in the width spacing of the retainer. Nevertheless, it is possible that only one end in the width direction of the retainer abuts on the large-diameter portion to clip the S spring at the rear pipe or the front pipe. When the latter clipping method is incorrectly adopted, a misassembly is caused. In this case, the inherent function of the S spring cannot be fulfilled, so there is a possibility that the seat occupant cannot be firmly supported. Further, the formation of the large-diameter portion by subjecting a portion of the rear pipe or the front pipe to a hydroforming process would add processing steps and cause an increase in cost.

SUMMARY OF THE INVENTION

An object of the present invention is to provide a spring member mounting structure, which does not need to implement special processing to a connecting rod such as a rear pipe or a front pipe, and is capable of mounting a spring member such as an S spring without producing a misassembly.

A first aspect of the present invention relates to a spring member mounting structure, which is a spring member mounting structure of a seat frame for a vehicle connecting a pair of side frames extending in parallel at both sides of a seat in width direction by use of a connecting rod, wherein the spring member is used for placing and supporting a pad body as a cushion material, and has an engaging portion engaged with the connecting rod; a cover member is provided at a central side of the seat frame for a vehicle of connecting portions of the side frames and the connecting rod; a portion of the cover member has an extension portion extending toward the central side of the seat frame for a vehicle to a position where the extension portion is in contact with or close to the connecting rod.

According to the first aspect, an end of the extension portion of the cover member abuts on the connecting rod to position the spring member. Thus, there is only one position where the spring member, which abuts on the end of the extension portion of the cover member, abuts on and is engaged with the connecting rod, which can prevent a misassembly. Further, there is no need to implement special processing, e.g., providing a diameter-expanding portion or the like on the connecting rod, so an increase in cost can be inhibited.

In a second aspect of the present invention, the extension portion may include the ends, and extends at a prescribed length to be in contact with or close to an outer peripheral surface of the connecting rod.

According to the second aspect, the extension portion, which includes the ends, extends at a prescribed length to be in contact with or close to the outer peripheral surface of the connecting rod. Therefore, even under a force in the width direction from the engaging portion of the spring member, deformation of the extension portion is small, and the spring member can be firmly positioned relative to the connecting rod.

In a third aspect of the present invention, the spring member may have a length in a width direction for supporting substantially the entire area of a seating surface of a seat occupant; the engaging portions are provided at both ends in a width direction of the spring member; and the cover members are respectively provided on the connecting portions of the side frames and the connecting rod at both sides of the seat frame for a vehicle, so as to position the spring member from left and right sides.

According to the third aspect, the engaging portions of the spring member are provided at both ends in the width direction, and respectively abut on the extension portions of the cover members provided at the connecting portions of the side frames on both sides and the connecting rod so as to be positioned. Thus, the positioning of the spring member relative to the connecting rod is more reliable, and can further reduce the possibility of a misassembly.

In a fourth aspect of the present invention, the extension portion may extend along an outer peripheral surface of the connecting rod with which the pad body placed above the connecting rod is not in contact.

According to the fourth aspect, since no extension portion of the cover member is sandwiched and present between the pad body and the connecting rod, there never appears a case where a foreign body sensation or the like is caused to the seat occupant to worsen the seating sensation.

BRIEF DESCRIPTION OF THE DRAWINGS

Features, advantages, and technical and industrial significances of exemplary embodiments of the invention will be described below with reference to the accompanying drawings, in which like numerals denote like elements, and wherein.

DETAILED DESCRIPTION OF EMBODIMENTS

Figure 1:
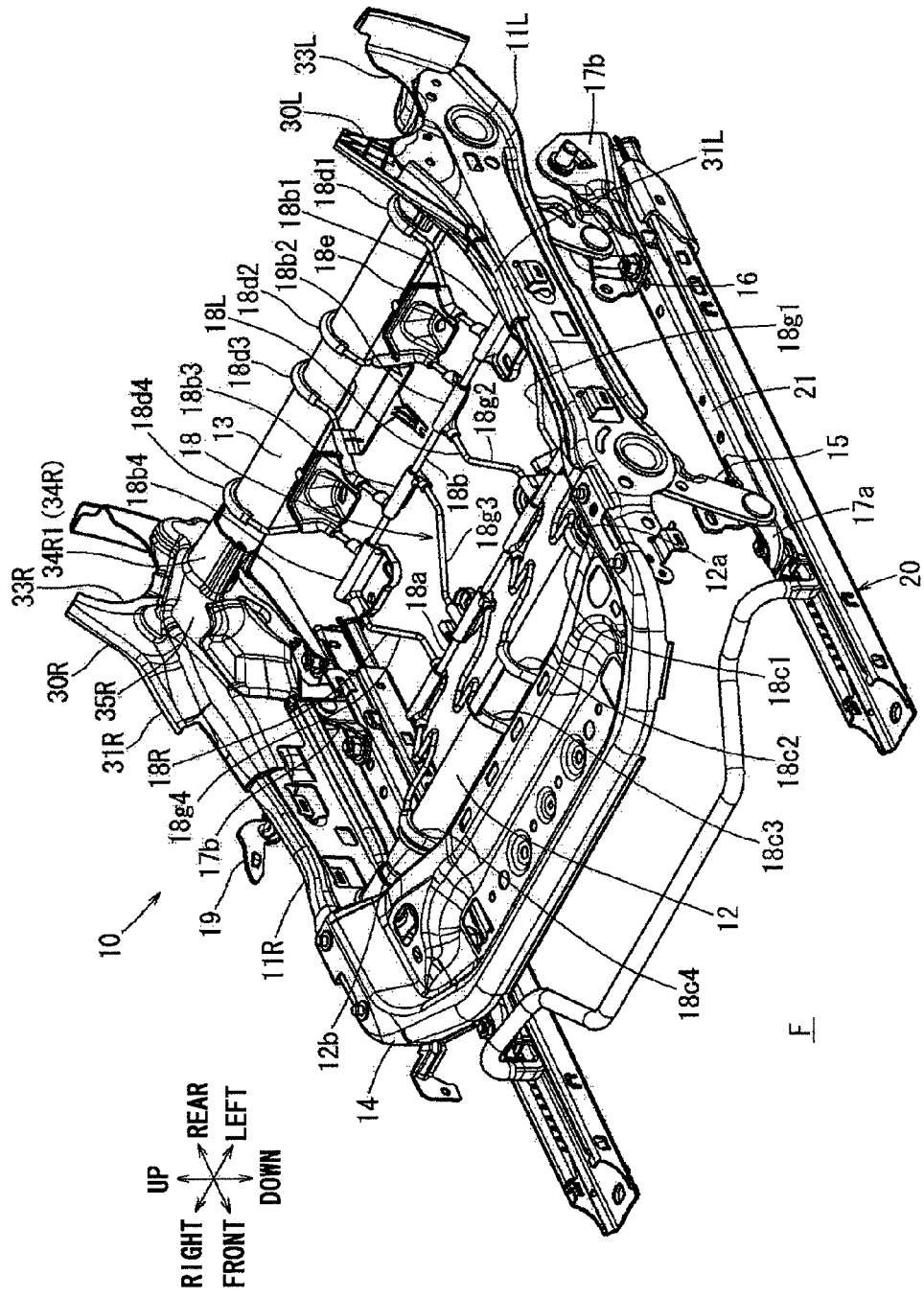
FIG. 1 is a perspective diagram of a cushion frame for an automobile of an embodiment of the present invention as observed obliquely from the front.

FIGS. 1-6 show an embodiment of the present invention. The embodiment shows an example in which the present invention is applied in a cushion frame for an automobile (hereinafter referred to as the cushion frame). In the various figures, the various directions of the cushion frame are indicated by arrows. In the following description, the depiction of the direction is given by taking these directions as references. The cushion frame 10 of the present embodiment is mounted with a back frame (not shown) in the rear of the cushion frame via a recliner (not shown) so as to constitute a seat frame. Since the back frame is a well known structure, the description thereof is omitted, and the cushion frame 10 is described.

The cushion frame 10 has, on left and right sides thereof, side frames 11L, 11R extending along a front-and-rear direction. The side frames 11L, 11R, which are substantially rectangular plate-shaped stamped parts, extend longitudinally in the front-and-rear direction, and are provided, at upper and lower ends thereof, with flanges extending in the seat outside direction. The side frames 11L, 11R are mounted, at a front side thereof, with a rotatable cylindrical front pipe 12, and mounted, at a rear side thereof, with a rotatable cylindrical rear pipe 13. A front panel 14 is mounted at an upper portion of a front end of the side frames 11L, 11R, and a pair of lower arms (not shown) is mounted at a rear end side thereof. The back frame (not shown) is mounted to the lower arms via the recliner (not shown), and the angel of the back frame relative to the cushion frame 10 can be adjusted by an operation of the above-mentioned recliner.

The cushion frame 10 is provided with a lifter mechanism so as to be movable upwards and downwards. Two front links 15 fixed to the front pipe 12 are rotatably mounted via a bracket 17a to an upper rail 21 of a slide rail 20 fixed to a floor F. Two rear links 16 fixed to the rear pipe 13 are rotatably mounted via a bracket 17b to the upper rail 21 of the slide rail 20 fixed to the floor F. The slide rail 20 is capable of adjusting the cushion frame 10 in a front-and-rear direction relative to the floor F.

The rear pipe 13 is rotatable relative to the side frames 11L, 11R by operating a lifter lever 19 in an up-and-down direction. When the rear pipe 13 is rotated, the rear link 16 is rotated in the up-and-down direction relative to the bracket 17b mounted to the upper rail 21. At this time, the front link 15, as a portion of a four-section link consisting of the side frames 11L, 11R, the front link 15, the upper rail 21 and the rear link 16, follows the movement of the rear link 16 so as to be rotated in the up-and-down direction. Thus, the cushion frame 10 moves upwards and downwards relative to the surface of floor F. The rear pipe 13 may be regard as "a connecting rod" in the Claims.

As shown in FIGS. 1-4, the spring member 18 forms a bridge between the front pipe 12 and the rear pipe 13. The spring member 18, which is a member for supporting the seat occupant via the pad body (not shown) used as a cushion material such as polyurethane foam, has two bent wires 18L, 18R extending in a front-and-rear direction and two rod-shaped wires 18a, 18b connecting the two bent wires 18L, 18R in a left-and-right direction (a width direction). The bent wires 18L, 18R each configure one wire in the folded form in the front-and-rear direction, and is bent at a plurality of parts in the width direction so as to place the pad body. The bent wires 18L, 18R, in the front part of the middle portion in the front-and-rear direction thereof, are joined to the rod-shaped wire 18a through integrally molded portions 18a1, 18a2, 18a3, 18a4 of resin. Further, the bent wires 18L, 18R, in the rear part of the middle portion in the front-and-rear direction thereof, are joined to the rod-shaped wire 18b through integrally molded portions 18b1, 18b2, 18b3, 18b4 of resin. The bent wires 18L, 18R are provided, at front ends thereof, with front clipping portions 18c1, 18c2, 18c3, 18c4 which can be clipped at the outer diameter of the front pipe 12. The front clipping portions 18c1, 18c2, 18c3, 18c4 are structures in which the front ends of the bent wires 18L, 18R are bent in the shape of a part of an arc and the resin is integrally molded. Thus, when the front ends of the bent wires 18L, 18R are clipped at the front pipe 12, they come in contact with the front pipe 12 via the resin and are relatively rotatable. It should be noted that the front clipping portions 18c1 and 18c4 are integrally molded using a resin alone, and the front clipping portions 18c2 and 18c3 are integrally molded using resins in combination. Spring portions 18f1, 18f2, 18f3, 18f4, which are molded into a U shape as observed in a top view, are provided between joints of the rod-shaped wire 18a and the front ends of the bent wires 18L, 18R. Owing to the presence of the above-mentioned spring portions 18f1, 18f2, 18f3, 18f4, the spring member 18 is stretchable in the front-and-rear direction and is capable of resiliently supporting the pad body in the up-and-down direction.

Bent portions 18g1, 18g2, 18g3, 18g4, which are molded into a crank shape and stretched in the front-and-rear direction as observed in a top view, are provided between a joint where the bent wires 18L, 18R join the rod-shaped wire 18a and a joint where the bent wires 18L, 18R join the rod-shaped wire 18b. Owing to the presence of the above-mentioned bent portions 18g1, 18g2, 18g3, 18g4, the spring member 18 can come in contact, at a longer part, with a cushion material, and can support the cushion material with a good stability. The bent wires 18L, 18R are provided, at rear ends thereof, with rear clipping portions 18d1, 18d2, 18d3, 18d4 which can be clipped at the outer diameter of the rear pipe 13. The rear clipping portions 18d1, 18d2, 18d3, 18d4 are structures in which the rear ends of the bent wires 18L, 18R are bent in the shape of a part of an arc and the resin is integrally molded. Thus, when the rear ends of the bent wires 18L, 18R are clipped at the rear pipe 13, they come in contact with the rear pipe 13 via the resin and are relatively rotatable. It should be noted that the bent wire 18L of the rear clipping portions 18d1 and 18d2 is connected at the terminal. That is to say, the bent wire 18L is composed of one wire that is simultaneously bent and connected from the front clipping portion 18c1 to the front clipping portion 18c2. In addition, likewise, the bent wire 18R of the rear clipping portions 18d3 and 18d4 is connected at the terminal. That is to say, the bent wire 18R is composed of one wire that is simultaneously bent and connected from the front clipping portion 18c3 to the front clipping portion 18c4. Further, bent portions, which are molded into a crank shape and stretched in the front-and-rear direction as observed in a top view, are provided between joints of the rod-shaped wire 18b and the rear ends of the bent wires 18L, 18R, and they have an integrated portion 18e integrally molded with resins. Owing to the presence of the above-mentioned integrated portion 18e, the spring member 18 is difficult to deform in a left-and-right direction (a width direction). Through the integral molding of these resins, the bent wires 18L, 18R and the rod-shaped wires 18a, 18b are integrally formed as the spring member 18. The rear clipping portions 18d1, 18d4 may be regarded "engaging portions" in the Claims.

As shown in FIGS. 1-5, a cover member 30R made of a resin is mounted to the joint of the side frame 11R and the rear pipe 13. The cover member 30R is a member covering the periphery of the joint of the side frame 11R and the rear pipe 13, and is manufactured by injection molding of polypropylene resin. An upper portion 31R and a lower portion 32R thereof each are engaged with a flange portion at the back of the side frame 11R, and thus are mounted to the side frame 11R. A partially arc-shaped notch 33R at an upper portion of the rear of the cover member 30R is a portion abutting on a recliner (not shown). A pipe cover 34R, which is provided to protrude toward a left-side direction (a seat inner-side direction) in the vicinity of a central portion in an up-and-down direction of the rear of the cover member 30R, covers the vicinity of a joint where the rear pipe 13 joins the side frame 11R. The pipe cover 34R consists of a pipe engaging portion 34R1 that is engaged with the rear pipe 13 in the vicinity of the joint where the rear pipe 13 joins the side frame 11R and that covers from an upper portion of the rear pipe 13 to a lower portion thereof, and an extension portion 34R2 extending from the rear of the pipe engaging portion 34R1 toward a left side (a seat inner side). The pipe engaging portion 34R1 has a substantially partial cylindrical shape lacking a front portion to extend along the outer periphery of the rear pipe 13 from a left side (a seat inner side) of a main body 35R of the cover member 30R in a leftward direction (a seat inner-side direction). Specifically, an upper surface portion and a lower surface portion of the pipe engaging portion 34R1 constitute a part of a cylinder along an outer peripheral shape of the rear pipe 13, and the cross section of a rear surface portion as cut along a plane perpendicular to the rear pipe 13 is substantially L-shaped. In addition, in the axial direction, a rear end of the upper surface portion and an upper end of the rear surface portion are coupled, and a lower end of the rear surface portion and a rear end of the lower surface portion are coupled, so as to constitute a substantially partial cylindrical shape lacking the front portion. An upper engaging portion 34R11, which is elastically engaged with an upper surface of the outer periphery of the rear pipe 13, is provided at an upper end of the pipe engaging portion 34R1, and a lower engaging portion 34R12, which is elastically engaged with a lower surface of the outer periphery of the rear pipe 13, is provided at a lower end of the pipe engaging portion 34R1. The cross section of the extension portion 34R2 as cut along a plane perpendicular to the rear pipe 13 is substantially L-shaped. That is to say, the extension portion 34R2 has a shape, which is continuous from the rear surface portion of the pipe engaging portion 34R1 in the leftward direction (the seat inner-side direction). The extension portion 34R2 has an upper end 34R21, a lower end 34R22 and a left end 34R23. When the cover member 30R is mounted to the side frame 11R, the upper engaging portion 34R11 and the lower engaging portion 34R12 of the pipe engaging portion 34R1 resiliently come in contact and are engaged with the outer peripheral surface of the rear pipe 13. Further, the upper end 34R21 and the lower end 34R22 of the extension portion 34R2 are configured in contact with the outer peripheral surface of the rear pipe 13. As described below, the left end 34R23 of the extension portion 34R2 abuts on a right side (a seat outer side) of the rear clipping portion 18d4 of the spring member 18, and supports the spring member 18 in such a manner of avoiding it to move in a rightward direction (a seat outer-side direction).

As shown in FIGS. 1-4 and 6, a cover member 30L made of a resin is mounted to the joint of the side frame 11L and the rear pipe 13. The cover member 30L is a member covering the periphery of the joint of the side frame 11L and the rear pipe 13, and is manufactured by injection molding of polypropylene resin. An upper portion 31L and a lower portion 32L thereof each are engaged with a flange portion at the back of the side frame 11L, and thus are mounted to the side frame 11L. A partially arc-shaped notch 33L at an upper portion of the rear of the cover member 30L is a portion abutting on a recliner (not shown). A pipe cover 34L, which is provided to protrude toward a right-side direction (a seat inner-side direction) in the vicinity of a central portion in an up-and-down direction of the rear of the cover member 30L, covers the vicinity of a joint where the rear pipe 13 joins the side frame 11L. The pipe cover 34L consists of a pipe engaging portion 34L1 that is engaged with the rear pipe 13 in the vicinity of the joint where the rear pipe 13 joins the side frame 11L and that covers from an upper portion of the rear pipe 13 to a lower portion thereof, and an extension portion 34L2 extending from the rear of the pipe engaging portion 34L1 toward a right side (a seat inner side). The pipe engaging portion 34L1 has a substantially partial cylindrical shape lacking a front portion to extend along the outer periphery of the rear pipe 13 from a right side (a seat inner side) of a main body 35L of the cover member 30L in a rightward direction (a seat inner-side direction). Specifically, an upper surface portion and a lower surface portion of the pipe engaging portion 34L1 constitute a part of a cylinder along an outer peripheral shape of the rear pipe 13, and the cross section of a rear surface portion as cut along a plane perpendicular to the rear pipe 13 is substantially L-shaped. In addition, in the axial direction, a rear end of the upper surface portion and an upper end of the rear surface portion are coupled, and a lower end of the rear surface portion and a rear end of the lower surface portion are coupled, so as to constitute a substantially partial cylindrical shape lacking the front portion. An upper engaging portion 34L11, which is elastically engaged with an upper surface of the outer periphery of the rear pipe 13, is provided at an upper end of the pipe engaging portion 34L1, and a lower engaging portion 34L12, which is elastically engaged with a lower surface of the outer periphery of the rear pipe 13, is provided at a lower end of the pipe engaging portion 34L1. The cross section of the extension portion 34L2 as cut along a plane perpendicular to the rear pipe 13 is substantially L-shaped. That is to say, the extension portion 34L2 has a shape, which is continuous from the rear surface portion of the pipe engaging portion 34L1 in the rightward direction (the seat inner-side direction). The extension portion 34L2 has an upper end 34L21, a lower end 34L22 and a left end 34L23. When the cover member 30L is mounted to the side frame 11R, the upper engaging portion 34L11 and the lower engaging portion 34L12 of the pipe engaging portion 34L1 resiliently come in contact and are engaged with the outer peripheral surface of the rear pipe 13. Further, the upper end 34L21 and the lower end 34L22 of the extension portion 34L2 are configured in contact with the outer peripheral surface of the rear pipe 13. As described below, the right end 34L23 of the extension portion 34L2 abuts on a left side (a seat outer side) of the rear clipping portion 18d1 of the spring member 18, and supports the spring member 18 in such a manner of avoiding it to move in a leftward direction (a seat outer-side direction).

The length in the left-and-right direction of the pipe engaging portion 34L1 and the extension portion 34L2 of the cover member 30L is set to be shorter than that of the pipe engaging portion 34R1 and the extension portion 34R2 of the cover member 30R. It is because the position where the pipe engaging portion 34L1 is mounted to the cover member 30L is closer to the seat inner side than the position where the pipe engaging portion 34R1 is mounted to the cover member 30R. The bent wires 18L, 18R and the rod-shaped wires 18a, 18b are integrated, by integral molding of the resin, to make the spring member 18 a single member. Thus, the left end 34R23 of the extension portion 34R2 abuts on the rear clipping portion 18d4 of the spring member 18, and the right end 34L23 of the extension portion 34L2 abuts on the rear clipping portion 18d1 of the spring member 18, so that the spring member 18 is supported so as not to move in a left-and-right direction relative to the cushion frame 10.

Figure 2:
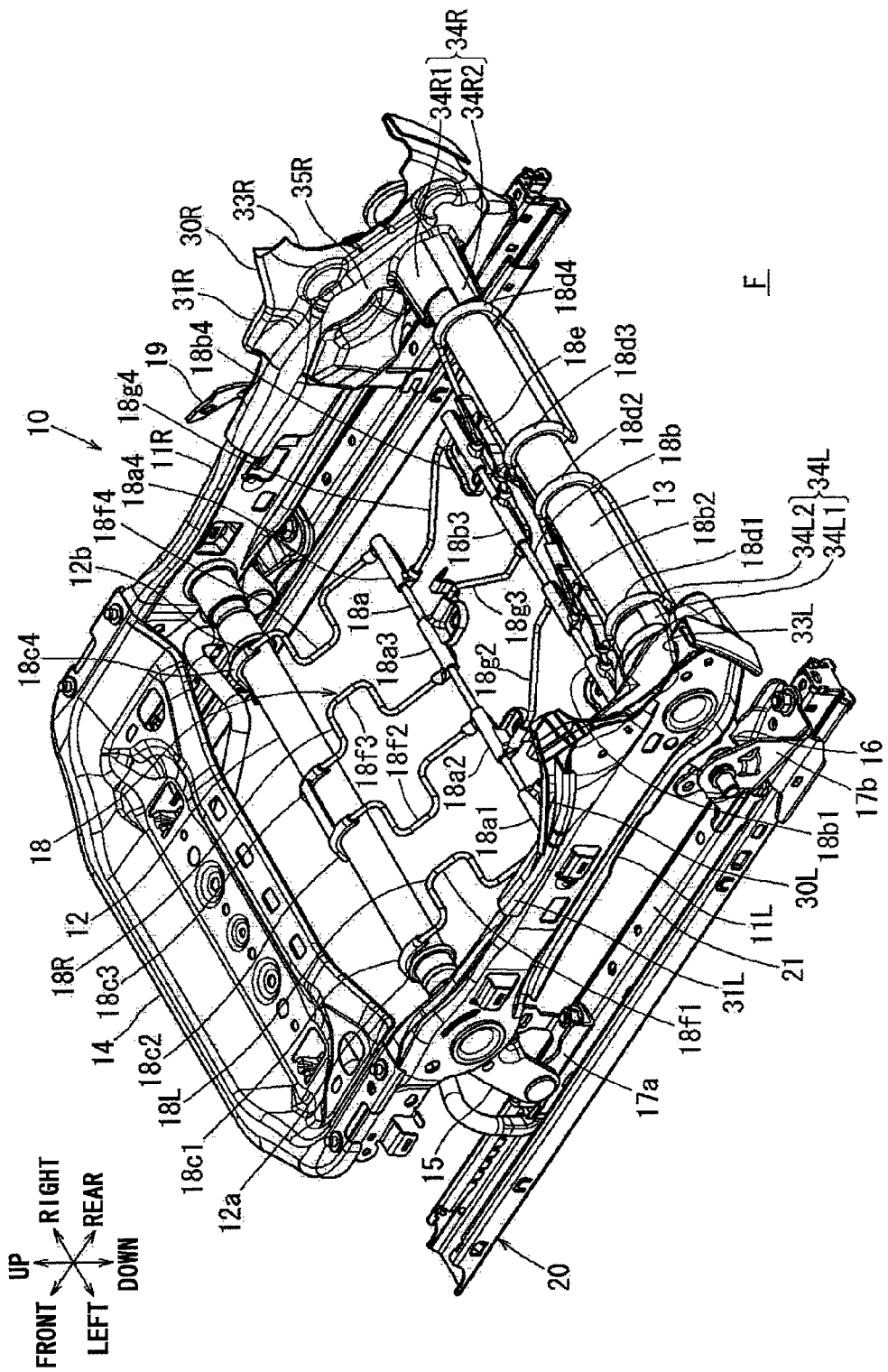
FIG. 2 is a perspective diagram of a cushion frame for an automobile of an embodiment of the present invention as observed obliquely from the rear.
Figure 3:
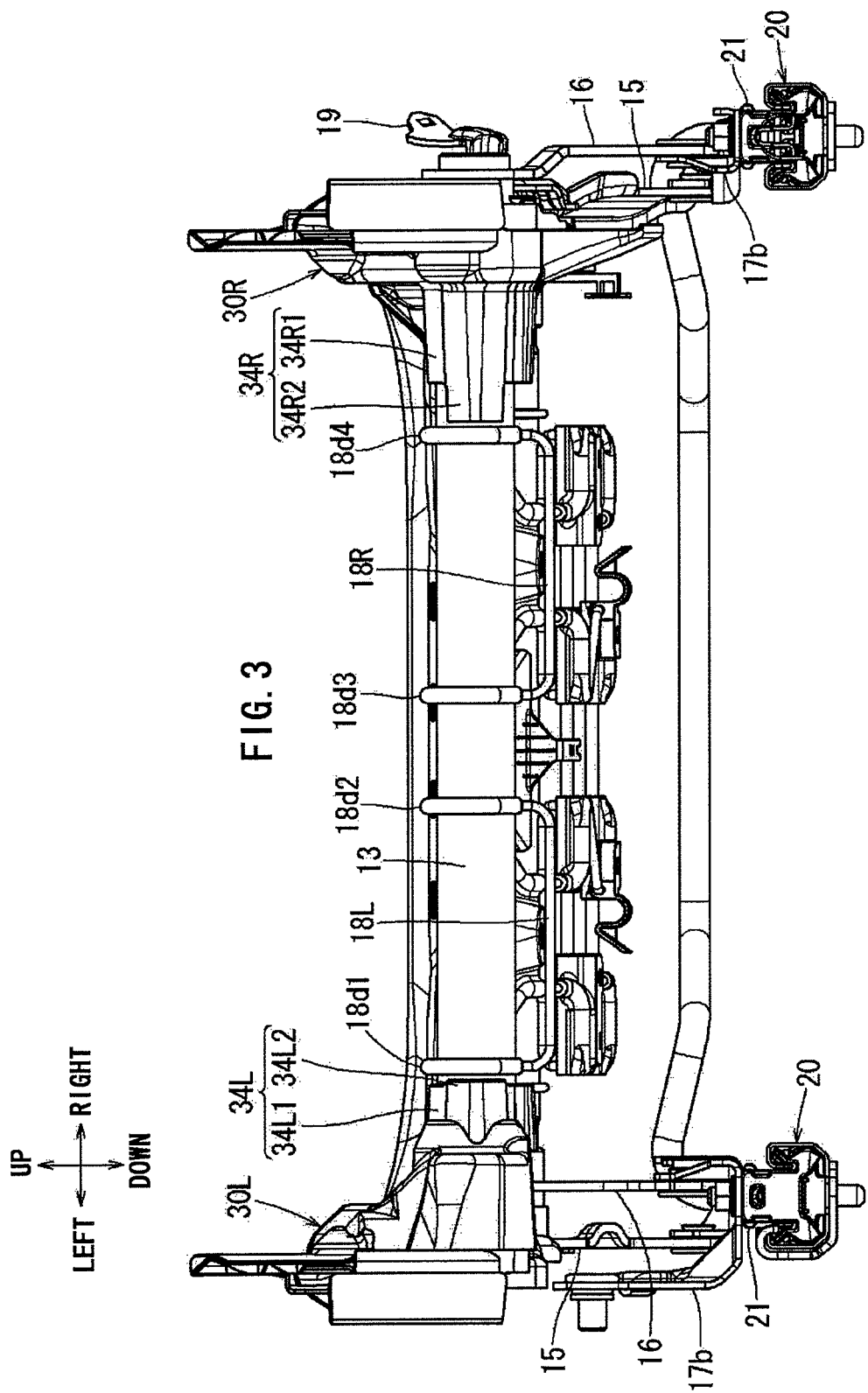
FIG. 3 is a rear view of the cushion frame for an automobile of the above-mentioned embodiment as observed from the rear.
Figure 4:
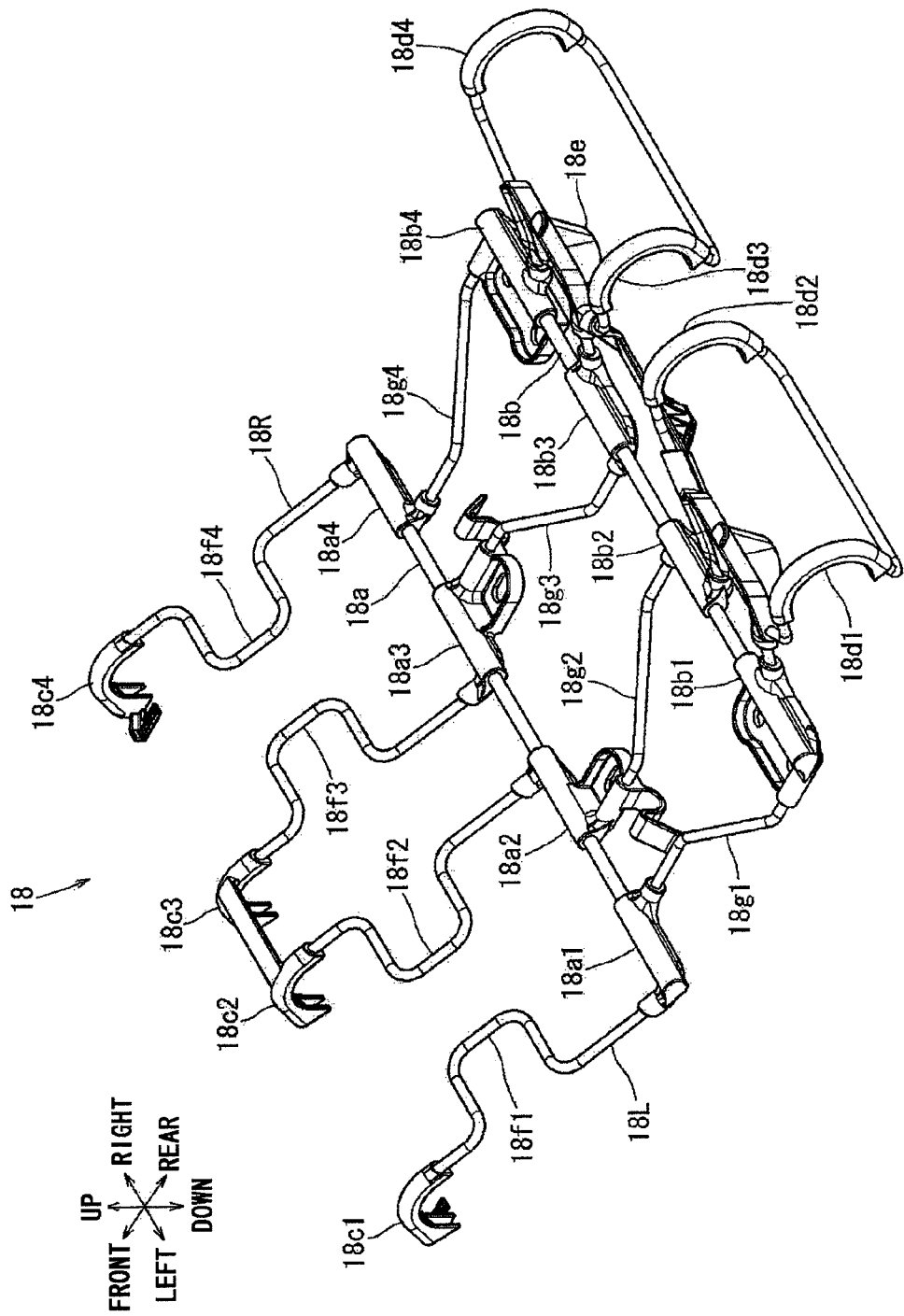
FIG. 4 is a perspective diagram of a spring member of the above-mentioned embodiment as observed obliquely from the rear.
Figure 5:
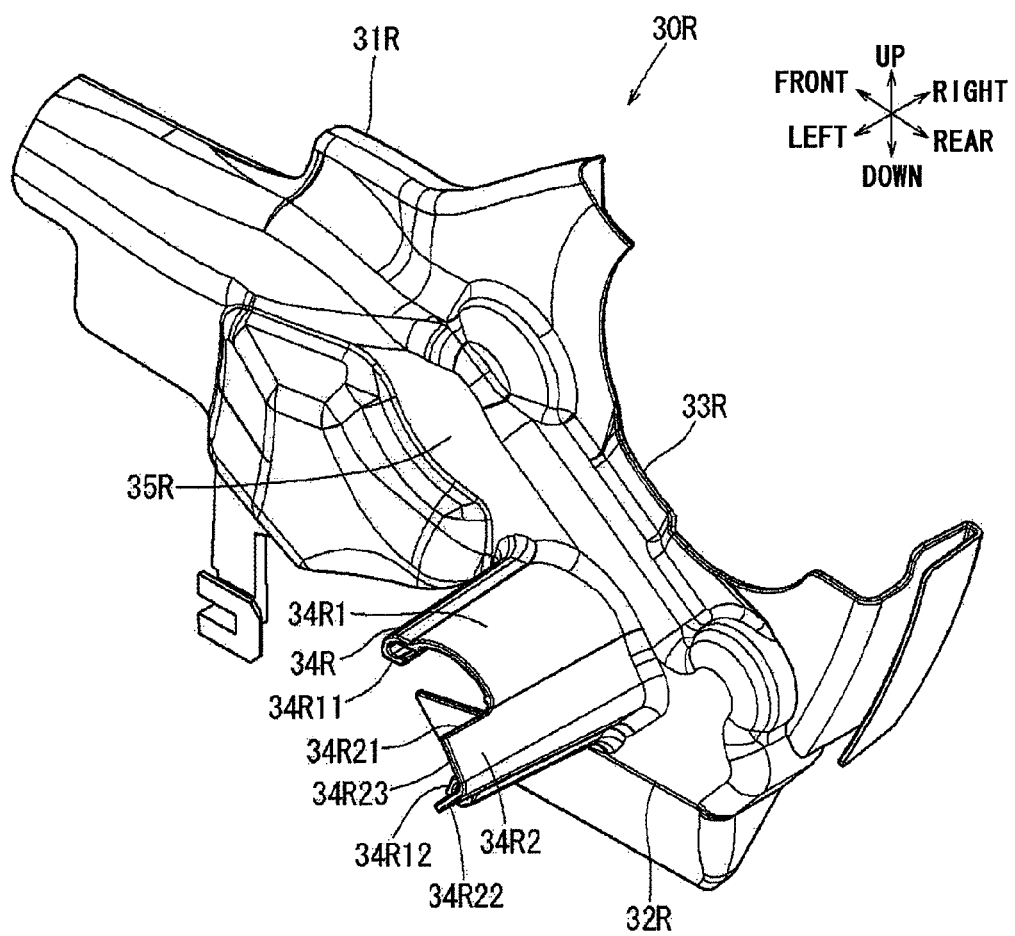
FIG. 5 is a perspective diagram of a cover member on the right side of the cushion frame for an automobile of the above-mentioned embodiment as observed obliquely from the rear.
Figure 6:
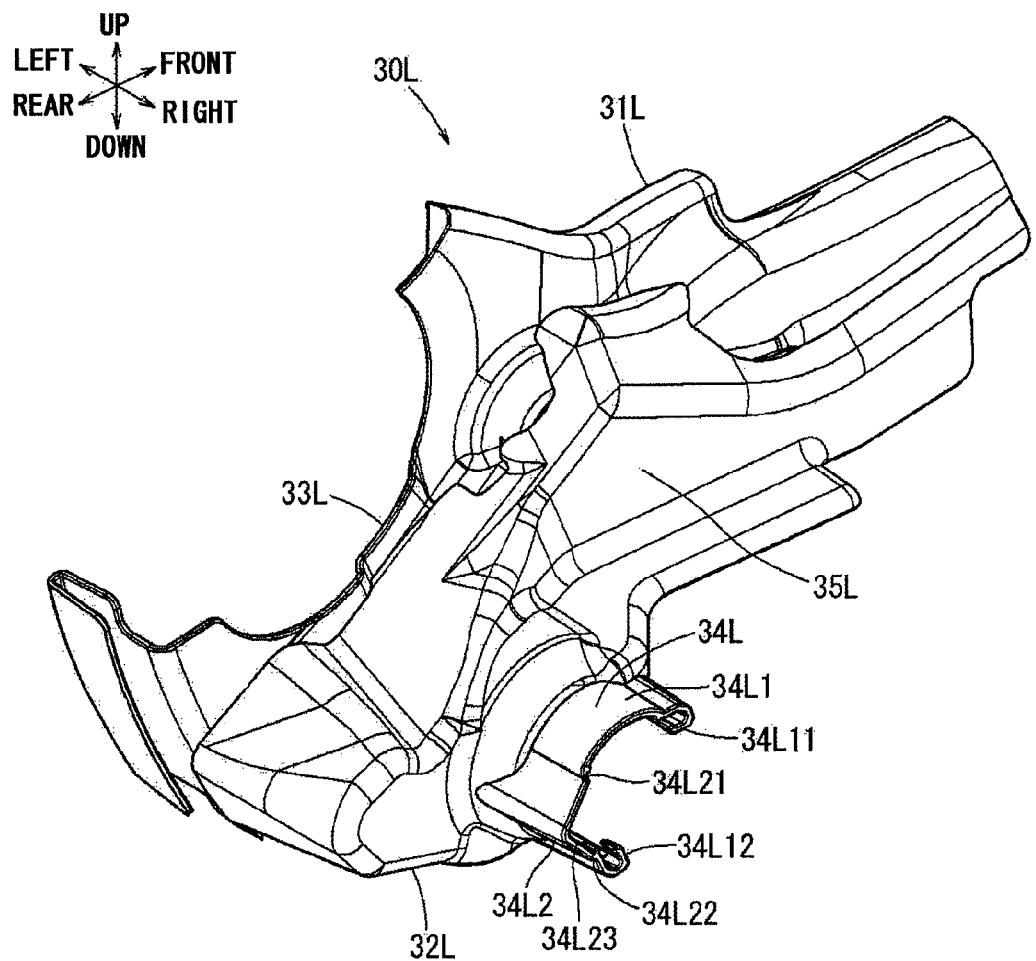
FIG. 6 is a perspective diagram of a cover member on the left side of the cushion frame for an automobile of the above-mentioned embodiment as observed obliquely from the rear.

As shown in FIGS. 1-2, the front pipe 12 is provided with diameter-expanded portions 12a, 12b. When the spring member 18 is positioned and mounted through the extension portions 34R2, 34L2 relative to the rear pipe 13, the diameter-expanded portion 12a abuts on a left side of the front clipping portion 18c1, and the diameter-expanded portion 12b abuts on a right side of the front clipping portion 18c4 so as to be provided at a position where it is engaged with the front pipe 12. The above-mentioned diameter-expanded portions 12a, 12b are not necessary structures, but, when provided, the positioning of the spring member 18 relative to the cushion frame 10 is more reliable.

The embodiment as described above has the following effects. The extension portions 34L2, 34R2 of the cover members 30L, 30R are provided at left and right sides of the cushion frame 10. In addition, the spring member 18 has an integral form, the rear clipping portion 18d4 abuts on the left end 34R23 of the extension portion 34R2, and the rear clipping portion 18d1 abuts on the right end 34L23 of the extension portion 34L2 so as to be positioned and mounted relative to the rear pipe 13. In the extension portion 34R2, only the left end 34R23 joins the outer peripheral surface of the rear pipe 13, so the rear clipping portion 18d4 merely abuts on and is mounted to the left end 34R23. Further, in the extension portion 34L2, only the right end 34L23 joins the outer peripheral surface of the rear pipe 13, so the rear clipping portion 18d1 merely abuts on and is mounted to the right end 34L23. Thus, the spring member 18 can be mounted to the rear pipe 13 without the possibility of a misassembly. The diameter-expanded portions 12a, 12b are only respectively provided at parts on the left and right of the front pipe 12, but are positioned in the left-and-right direction in the mounting of the spring member 18 to the rear pipe 13. Therefore, it is possible to automatically place the front clipping portions 18c1, 18c4 on one side of the diameter-expanded portions 12a, 12b and inhibit the possibility of a misassembly. Furthermore, there is only a need to change the shape of a portion of the cover members 30L, 30R as existing components, which can inhibit an increase in cost for a lower cost. Besides, the extension portions 34L2, 34R2 are placed at the rear surface portion of the rear pipe 13, so they are not present between the pad body and the rear pipe 13 so as to avoid a foreign body sensation of the seat occupant.

According to the above disclosure, a particular embodiment has been described, but the present invention is not limited to the above-mentioned appearance and structure. Various changes, additions and deletions can be made within the scope of not changing the gist of the present invention. For example:

1. In the above-mentioned embodiment, the upper end 34L21 and the lower end 34L22 of the extension portion 34L2 of the cover member 30L, and the upper end 34R21 and the lower end 34R22 of the extension portion 34R2 of the cover member 30R abut on the rear pipe 13. Nevertheless, the configuration, which is not limited to this, may be that a portion of the right end 34L23 of the extension portion 34L2 of the cover member 30L and a portion of the left end 34R23 of the extension portion 34R2 of the cover member 30R are close to the rear pipe 13. That is to say, it is only required that the right end 34L23 and the left end 34R23, at least for positioning in the width direction of the spring member 18, are close to the outer peripheral surface of the rear pipe 13 in the manner of respectively abutting on the rear clipping portion 18d1 and the rear clipping portion 18d4 of the spring member 18.

2. In the above-mentioned embodiment, the cross section of the extension portions 34L2, 34R2 of the cover members 30L, 30R, as cut along a plane perpendicular to the rear pipe 13, has a substantial L shape. Nevertheless, the shape, which is not limited to this, may also be an arc shape along the outer peripheral surface of the rear pipe 13.

3. In the above-mentioned embodiment, the present invention is applied to the cushion frame. Nevertheless, the application is not limited to this. If the spring member is mounted on the connecting rod connecting a pair of side frames in the structure, it may also be applied to a back frame.

4. In the above-mentioned embodiment, the present invention is applied to the seat for an automobile, but it may also be applied to seats mounted in an airplane, a boat, an electric car, etc.

What is claimed is:

1. A spring member mounting structure of a seat frame for a vehicle comprising:
    a connecting rod that connects, in a width direction of the seat frame, a pair of side frames of the seat frame that extend in parallel;
    a spring member that is configured to support a pad body, the spring member includes engaging portions that are engaged with the connecting rod; and
    cover members that cover joints between the side frames and the connecting rod, the cover members each include an extension portion that extend toward a center of the seat frame to a position that is at least one of in contact with and adjacent to the connecting rod, wherein
    each extension portion includes an end that faces the center of the seat frame and that abuts on a respective engaging portion of the spring member.

2. The spring member mounting structure according to claim 1, wherein
    the ends of the extension portions abut on the engaging portions so as to determine a width direction position of the spring member.

3. The spring member mounting structure according to claim 1, wherein
    a portion of the extension portions, which comprises the ends, extends to be at least one of in contact with and adjacent to an outer peripheral surface of the connecting rod.

4. The spring member mounting structure according to claim 1, wherein
   the spring member has a length in the width direction of the seat frame that defines a parameter of an area of a seating surface of a seat occupant,
   the engaging portions are provided at both of ends of the spring member in the width direction of the seat frame, and
   the cover members are respectively provided on the joints of the side frames and the connecting rod at both sides of the seat frame so as to position the spring member from left and right sides.

5. The spring member mounting structure according to claim 1, wherein
   the extension portions extend along an outer peripheral surface of the connecting rod and are configured to avoid contact with the pad body that is configured to be placed above the connecting rod.

6. The spring member mounting structure according to claim 1, wherein
   the engaging portions are clipping portions that have an arcuate shape that corresponds to an outer peripheral surface of the connecting rod, and
   the clipping portions are clipped to the outer peripheral surface of the connecting rod.

\* \* \* \* \*